United States Patent
Vaara et al.

[11] Patent Number: 5,907,808
[45] Date of Patent: May 25, 1999

[54] HANDOVER WITH FAST MOVING MOBILE STATION DETECTION BETWEEN A MICROCELL AND A MACROCELL

[75] Inventors: Tomi Vaara, Espoo; Timo Halonen, Helsinki, both of Finland

[73] Assignee: Nokia Telecommunications Oy, Espoo, Finland

[21] Appl. No.: 08/727,574

[22] PCT Filed: Apr. 12, 1995

[86] PCT No.: PCT/FI95/00211

§ 371 Date: Oct. 15, 1996

§ 102(e) Date: Oct. 15, 1996

[87] PCT Pub. No.: WO95/28813

PCT Pub. Date: Oct. 26, 1995

[30] Foreign Application Priority Data

Apr. 15, 1994 [FI] Finland ................................. 941780

[51] Int. Cl.⁶ ........................................... H04Q 7/20
[52] U.S. Cl. ........................... 455/441; 455/443; 455/44
[58] Field of Search .................................. 455/422, 432, 455/435, 436, 440, 441, 443, 444, 445, 455, 456, 457, 458, FOR 100, FOR 101, FOR 103, FOR 104, FOR 105; 370/329, 330, 331, 332, 333, 341

[56] References Cited

U.S. PATENT DOCUMENTS 4,876,738  10/1989  Selby ........................................ 455/435
5,530,910  6/1996  Taketsugu ................................ 455/444

FOREIGN PATENT DOCUMENTS 589 278    3/1994   European Pat. Off. .
468 696    3/1993   Sweden .
2 242 806  10/1991  United Kingdom .

*Primary Examiner*—Thanh Cong Le
*Attorney, Agent, or Firm*—IP Group of Pillsbury Madison & Sutro LLP

[57] ABSTRACT

In a hierarchical micro/macro-cell network, a mobile station will be handed over from a microcell to a macrocell if a number of microcells recognize the mobile station as fast, so that the fast moving mobile stations do not cause a considerable number of handovers between microcells, which make the call control difficult. However, in order to avoid unnecessary switches up to macrocells, a mobile station and the call are handed over to a macrocell only when the mobile station is recognized as fast in a sufficient number of microcells.

6 Claims, 1 Drawing Sheet

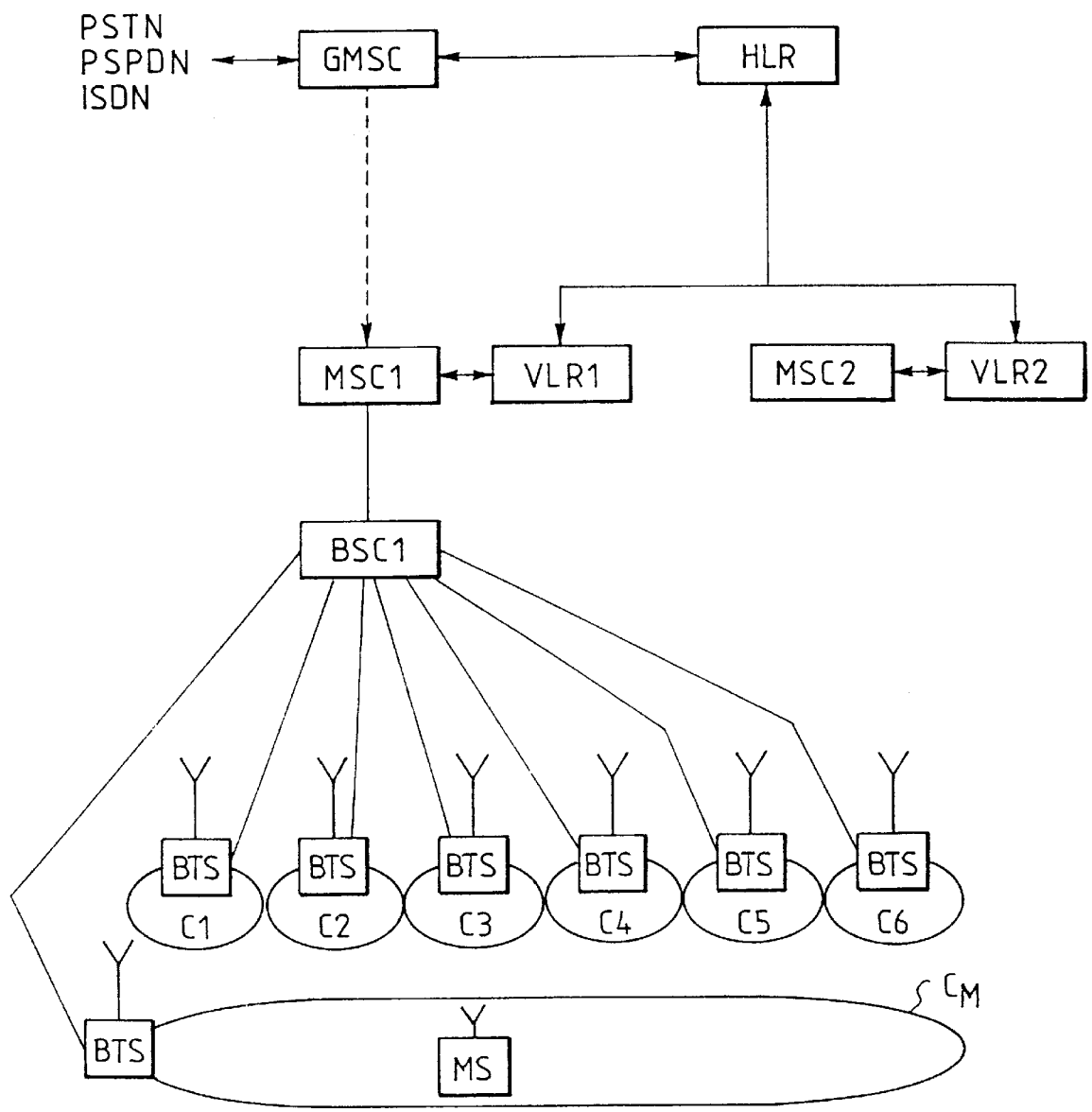

HANDOVER WITH FAST MOVING MOBILE STATION DETECTION BETWEEN A MICROCELL AND A MACROCELL

FIELD OF THE INVENTION

The invention relates to a method for implementing handover between a microcell and a macrocell in a cellular mobile system comprising mobile stations, a microcell network used primarily by mobile stations with a relatively lower transmitting power, a macrocell network which geographically at least partly overlays the microcell network, the macrocell network being primarily used by mobile stations with a relatively higher transmitting power.

BACKGROUND OF THE INVENTION

The geographical area covered by cellular mobile systems is divided into smaller radio coverage areas, cells, to achieve a more efficient utilization of the frequency band through frequency re-use. The size of cells varies from one mobile system to another, as well as geographically within a mobile system depending on a multitude of factors, such as the capacity required (number of channels, terrain, transmitting power levels, etc.). One factor which influences cell size is the maximum transmitting power of a mobile station. In the recent past, the mobile stations in conventional mobile systems were vehicle-mounted high-power radio stations whose transmitting power made large cell sizes possible. In addition to these, small hand-held mobile stations have emerged; these latter mobile stations have a considerably lower transmitting power than the vehicle-mounted stations in order to reduce current consumption, for example. These hand-held mobile stations have a considerably smaller range of operation and, as a result, the cell size must also be smaller.

In modern mobile systems, both low-power hand-held mobile stations and vehicle-mounted mobile stations that have a higher output power are used side by side. Further, two geographically overlaying types of cell, large macrocells and small microcells, have been employed. High-power mobile stations are thus assigned to a macrocell network, and low-power hand-held mobile stations to a microcell network. Because the high-power vehicle-mounted stations, moreover, move in the network with higher speed than the hand-held mobile phones, the use of macrocells results in a smaller number of handovers. The hand-held mobile stations are, in turn, relatively immobile and thus the number of handovers will not be unreasonable even in a dense microcell network. Decision on a handover of a mobile station between two microcells is made on the basis of radio connection, usually on the basis of the level or quality of the received signal.

In a hierarchical network divided to microcells and macrocells, a problem occurs regarding hand-held mobile stations that move fast in relation to cell size. As far as the network is concerned, a mobile station can be considered fast moving, if it is used, for example, in a moving vehicle such as train, tram, bus or car. In modern mobile systems, this kind of a fast moving hand-held mobile station may cause a considerable number of handovers, which may make controlling of the call very difficult. It would be advantageous if the fast moving mobile stations were served by macrocells, so that the number of handovers would not increase remarkably. On the other hand, slow moving hand-held mobile stations should be served by microcells so that macrocell capacity might be saved. For this reason it would be advantageous to be able to detect a fast moving hand-held mobile station in a microcell, and hand it up to an overlaying macrocell. In present systems, however, there are no means to detect a fast moving mobile station in a microcell network.

SUMMARY OF THE INVENTION

It is thus an object of the present invention to provide a method for detecting a fast moving mobile station in a microcell network and hand it up to a macrocell network, which method is according to the invention characterized by:

assigning a time limit to at least some of the microcells, measuring the time between the entry of a mobile station to a microcell and its exit from the microcell, determining the direction of entry and exit of the mobile station, recognizing the mobile station as fast in the microcell, if the time measured is shorter than the said time limit and the direction of entry is different than the direction of exit, and handing over a mobile station using a microcell network temporarily to a macrocell network, if a sufficient number of microcells identify the mobile station as fast.

The invention also relates to a cellular mobile system comprising:

mobile stations, a microcell network primarily used by mobile stations with a relatively lower transmitting power, and a macrocell network geographically at least partly overlaying the microcell network, and the macrocell network being primarily used by mobile stations with a relatively higher transmitting power.

It is characteristic to a mobile system in accordance with the invention that:

at least some of the microcells are assigned at least two groups of neighboring cells each group having at least one neighboring cell, at least some of the microcells are assigned a predetermined threshold value for the time the mobile station is registered to the microcell and, a mobile station primarily using the microcell network can temporarily be handed over to the macrocell network, if the mobile station moves from one group of neighboring cells to the microcell and, further, to a second group of neighboring cells with such high speed that the time of registration in the microcell is, in a predetermined share of microcells through which the mobile station moves, shorter than the predetermined threshold value in each respective microcell.

In the present invention, a fast moving mobile station is detected on the basis of the time the mobile station is connected to a serving cell and on the basis of the direction the mobile station is moving to. The connection time can be determined by advantageously assigning to each microcell, or possibly only some of them, a specific time limit to which the time between the entry of a mobile station to and the exit from a microcell is compared. The direction to which the mobile station is moving is monitored by determining the direction of entry of the mobile station to the microcell and the direction of exit from the microcell. A mobile station is identified as fast moving, if its connection time in the microcell is shorter than the predetermined time limit assigned to the microcell, and the direction of entry of the mobile station is different than the direction of exit. The aim of monitoring the directions of entry and exit is to avoid erroneously recognizing a mobile station as fast moving in cases the short connection time in a cell is a result of, for example, a mobile station returning immediately back to the direction of its entry. In the preferred embodiment of the invention, each microcell, or possibly only some of them, are advantageously assigned at least two groups of neighboring cells, each group including at least one neighboring cell. The aim is to determine the groups of neighboring cells cell-specifically so that unnecessary handovers to macrocells be avoided. A mobile station is recognized as fast moving in the serving cell if a call has been handed over to the serving cell from a microcell that belongs to a certain group of neighboring cells, and, further, handed over from the serving cell to a cell that belongs to a second group of neighboring cells, and if the connection time in the serving cell is shorter than the time limit assigned to the serving cell. In order to avoid errors in detection and unnecessary switches up to macrocells, a mobile station and the call are handed over to a macrocell in the preferred embodiment of the invention only when the mobile station is recognized as fast moving in a sufficient number of microcells. Thus, misinterpretations in single cells are filtered off. A mobile station can, for example, be handed over to an overlaying macrocell if the mobile station is recognized as fast moving in a preset number P of those N consecutive microcells that have served the mobile station last. Other methods can also be used for such filtering off, including, for example, various averaging methods.

BRIEF DESCRIPTION OF THE DRAWINGS

In the following, the invention will be described in greater detail with reference to the accompanying drawing, in which:

FIG. 1 illustrates a cellular mobile system in accordance with the invention.

DETAILED DESCRIPTION OF PREFERRED EMBODIMENTS OF THE INVENTION

The present invention can be applied in any cellular radio network such as the pan-European mobile system GSM (Global System for Mobile Communications), NMT (Nordic Mobile Telephone), DSC1800 (Digital Communication System), PCN (Personal Communication Network), UMC (Universal Mobile Communication), FPLMTS (Future Public Land Mobile Telecommunication System), etc.

As far as the present invention is concerned, it be only essential that there is in use in a mobile communication system, at least locally, a microcell network and a macrocell network which geographically at least partly overlays the microcell network.

As is well known, in cellular radio networks, the geographical area covered by a network is divided into smaller, separate radio coverage areas, i.e. cells, so that a mobile station MS currently in cell C communicates with the cell through base station BS which is a fixed radio station located in the cell, as illustrated in FIG. 1. Mobile stations MS can freely move from one cell to another. A mobile station MS determines whether it is necessary to switch to another cell by continuously measuring the level and often also the quality of the signal received from the base station of the serving cell, and, in addition, the level of the signal received from base stations of at least a few neighboring cells. Alternatively, or in addition to, base stations can also measure the level and quality of signals transmitted by mobile stations. Depending on the mobile system, the decision on switching of cells is made either by the mobile station or the fixed network. If a mobile station does not have an ongoing call, the switching of cells only means registering to a new cell. If a mobile station MS is handling a call, the cell switching process also contains switching the call to a new cell, i.e. handover. The criterion for selecting a new cell is usually based on the best quality or level of the signal, and/or the lowest possible transmitting power levels. The exact method for implementing handover is not essential to the present invention and thus it is not described here in greater detail.

FIG. 1 illustrates a mobile system with a hierarchically and geographically overlaying microcell and macrocell network. The exemplary system shows a fixed network in accordance with a GSM mobile system, but the invention can be implemented in the structure of any fixed network. The fixed network of the GSM system includes at least a home location register HLR, a visitor location registers VLR, mobile switching centers MSC, and base station controllers BSC which are connected to base stations BTS of the network. More accurate location information of the subscriber, in other words the location area data, is stored in the visitor location register VLR. There is typically one VLR per each mobile switching center MSC. The home location register HLR permanently maintains the subscriber data of the subscriber and information of which VLR area the mobile station MS is located in. The structure of the GSM system and its operation are described in greater detail in the GSM recommendations and in "The GSM System for Mobile Communications", M. Mouly & M. Pautet, Palaiseau, France, ISBN: 2-9507190-0-7.

In the example of FIG. 1, there are two mobile services switching center areas, the first of which containing the mobile switching center MSC1 as well as visitor location register VLR1, and the second containing the mobile switching center MSC2 and the visitor location register VLR2. Under both MSCs, there are one or more base station controllers BSC, each of which controls several base stations BTS. FIG. 1 only shows one base station controller BSC1, which controls the base stations BTS of microcells C1, C2, C3, C4, C5 and C6, as well as the base station BTS of one macrocell $C_M$. Each base station BTS communicates via a duplex connection with mobile stations MS that are located in a corresponding cell. For reasons of clarity, FIG. 1 only shows one mobile station MS.

In FIG. 1, microcells C1–C6 belong to a microcell network primarily used by mobile stations MS that have a relatively low transmitting power and that are relatively immobile, such as hand-held mobile stations. The macrocell $C_M$ of the macrocell network geographically at least partly overlays the microcells C1–C6 of the microcell network. The macrocell is primarily used by mobile stations that have a high transmitting power and that move relatively fast, such as vehicle-mounted radio stations. Normally, the mobile stations MS that use the microcell network only move from one microcell to another according to system-specific crossover and handover procedures. Accordingly, the mobile stations that use the macrocell network move from one macrocell to another according to the same system-specific crossover and handover procedures.

According to the invention, the mobile system of FIG. 1 has as an additional feature a temporary handover of a mobile station MS primarily using a microcell network to a macrocell network when the mobile station is recognized as moving very fast in the microcell network compared to the sizes of the microcells, and thus causing an unreasonable number of handovers. The detection of a fast moving mobile station MS in based on the time the mobile station spends registered to the serving cell as well as on the moving direction of the mobile station MS.

In the preferred embodiment of the invention, a predetermined time limit and at least two groups of neighboring cells are assigned to each microcell, or possibly only some of them. The time limit is set for the time the mobile station spends connected to a microcell. The group of neighboring cells comprises of neighboring cells and may include one or more neighboring cells. It is possible that one or more of the neighboring cells are not included in any of the groups of cells. The assignment of the neighboring groups of cells has to be sensible and cell-specific so that unnecessary handovers to macrocells be avoided.

A mobile station MS is recognized as fast moving in the serving cell, if a call has been handed over to the serving cell from a microcell that belongs to a certain group of neighboring cells, and if the call is further switched from the serving cell to a cell that belongs to a second group of neighboring cells, and if the connection time in the serving cell is shorter than the time limit assigned to the serving cell. The mobile station is not recognized as a fast moving mobile station, if the call is handed over to the serving cell from a cell of a certain group, and from the serving cell back to a cell of the group of neighboring cells, even if the connection time in the serving cell were shorter than the time limit assigned to the cell. The mobile station is neither recognized as a fast moving mobile station, if the connection time of the mobile station in the cell is shorter than the time limit assigned to the cell.

The decision on carrying out a handover from a microcell network to a macrocell can in principle be made immediately once the mobile station has been recognized as a fast moving mobile station even in one cell. However, if this were done, it would mean that a mobile station might with considerable possibility be erroneously recognized as fast moving, and so the possibility of unnecessary handovers is increased. Thus, it is advantageous to make the decision on handover only as several cells recognize the mobile station as a fast moving mobile station. This way, the recognition of a mobile station to be fast moving due to interference or a temporary change in speed can be filtered off, and the mobility behavior of the mobile station can better be estimated on the basis of longer travel in the network. In the primary embodiment of the invention, this is achieved by defining two extra parameters, N and P, which are used to describe the history of comparison of connection time in those microcells which the mobile station has earlier visited. P and N are positive integers, and P≦N. Parameter N signifies N consecutive microcells. Parameter P tells in how many of these N consecutive microcells the mobile station has been recognized as fast moving. These parameters are utilized in the handover decision-making so that if a preset number P of the last N consecutive cells are such that they have recognized the mobile station as fast moving, the call is handed over from the microcell to an overlaying macrocell.

Let us assume that one neighboring group of cells of the microcell C5 in FIG. 1 comprises microcells C3 and C4, and a second neighboring group of cells comprises the microcell C6, and the time limit assigned to the microcell C5 is two minutes. These parameters are included in the handover control parameters of the cell C5 and they are stored in the base station controller BSC together with the handover algorithm. The base station controller BSC1 further maintains the history of the mobile station in the form of parameters N and P. A mobile station MS having an ongoing call moves from the microcell C4 to the microcell C5, and from the microcell C5 further to the microcell C6. The connection time of the mobile station MS is one minute in the microcell C5. Because the mobile station MS in addition enters the microcell C5 from a different direction than to which it exits from the microcell C5, the mobile station MS is recognized as a fast moving mobile station in the cell C5. After this, the base station controller BSC1 checks from the history of the mobile station in the last N microcells, including C5, whether the number of those cells which have recognized the mobile station as fast moving is smaller, equal to, or higher than the parameter P. If the number of cells is smaller than the parameter P, the call is not handed up to the macrocell $C_M$ overlaying the microcell C5. If the number of cells is higher than or equal to the parameter P, a handover of the mobile station MS is carried out from the microcell C5 to the macrocell $C_M$. Following this, the mobile station moves in the macrocell network and calls are handed over between macrocells.

Handover of the mobile station MS back to the microcell network is carried out once the call is ended. In addition to this, or alternatively to this, a similar or different method to the one described above in connection with a microcell network can be applied to a macrocell network for mobile station speed detection. The handover of a mobile station from a macrocell network to a microcell network is not, however, essential to the present invention, and it is not described here any further.

The figure and the description referring to it are only intended to illustrate the present invention. The invention may vary in details within the scope and spirit of the attached claims.

We claim:

1. A method for implementing handover between a microcell and a macrocell in a cellular mobile system comprising mobile stations, a microcell network used primarily by those of the mobile stations which have a relatively lower transmitting power and speed, and a macrocell network which geographically at least partly overlays the microcell network, the macrocell network being primarily used by those of the mobile stations which have a relatively higher transmitting power and speed, comprising the steps of:

assigning a time limit to at least some of the microcells, measuring the time between the entry of a mobile station to a microcell and its exit from the microcell, determining the direction of entry and exit of the mobile station, recognizing the mobile station as fast in the microcell, if the time measured is shorter than said time limit and the direction of entry is different than the direction of exit, and handing over a mobile station using a microcell network to a macrocell network, if a sufficient number of microcells recognize the mobile station as fast.

2. The method as claimed in claim 1, further comprising:

assigning at least two groups of neighboring cells to all microcells which have the assigned time limit, each of said groups of neighboring cells including at least one neighboring cell, and recognizing the mobile station as fast in the microcell, if the time measured is shorter than said time limit, and, if the mobile station has entered the microcell from one group of neighboring cells and exited from the microcell to a second group of neighboring cells.

3. The method as claimed in claim 2, further comprising:

measuring the time between the entry of a mobile station to and its exit from a cell in N consecutive microcells, and handing over of a mobile station using a microcell network to use a macrocell network, if the mobile station is recognized as being fast in P microcells, in which N and P are possible integers, and $N \geq P$.

4. The method as claimed in claim 1 further comprising:

measuring the time between the entry of a mobile station to and its exit form a cell in N consecutive microcells, and handing over of a mobile station using a microcell network to use a macrocell network, if the mobile station is recognized as being fast in P microcells, in which N and P are positive integers, and $N \geq P$.

5. A cellular mobile system comprising:

a plurality of mobile stations some of which have a relatively lower transmitting power and speed, and others of which have a relatively higher transmitting power and speed, a microcell network primarily used by those of said mobile stations which have a relatively lower transmitting power and speed, said macrocell network comprising a plurality of microcells, a macrocell network geographically at least partly overlaying said microcell network, and being primarily used by those of said mobile stations which have a relatively higher transmitting power and speed, at least some of said microcells being assigned at least two groups of neighboring cells each group having at least one neighboring cell, at least some of said microcells being assigned a predetermined threshold value for the time a respective mobile station is registered to the respective microcell, said system being arranged such that a respective mobile station primarily using said microcell network can be handed over to said macrocell network, if the respective mobile station moves from one group of neighboring cells relative to one said microcell and, further, to a second group of neighboring cells with such high speed that the time of registration in a microcell is, in a predetermined share of said microcells through which the mobile station moves, shorter than the said predetermined threshold value in each respective microcell.

6. The mobile system according to claim 5, wherein:

each respective said mobile station is arranged to be handed over to said macrocell network, if the time of registration of the respective mobile station in P cells of N consecutive microcells is shorter than said predetermined threshold value, N and P being positive integers, and $N \geq P$.

* * * * *